(12) United States Patent
Arias et al.

(10) Patent No.: US 10,610,767 B2
(45) Date of Patent: Apr. 7, 2020

(54) UNCONVENTIONAL WARFARE WARGAME

(71) Applicant: The United States of America, as represented by the Secretary of the Navy, Arlington, VA (US)

(72) Inventors: Jeremy Arias, Baker, FL (US); Chad Klay, APO, AP (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/274,096

(22) Filed: Feb. 12, 2019

(65) Prior Publication Data

US 2019/0247741 A1    Aug. 15, 2019

Related U.S. Application Data

(60) Provisional application No. 62/629,534, filed on Feb. 12, 2018.

(51) Int. Cl.
*A63F 3/00* (2006.01)
*A63F 13/822* (2014.01)

(52) U.S. Cl.
CPC ...... *A63F 3/00075* (2013.01); *A63F 3/00697* (2013.01); *A63F 13/822* (2014.09); *A63F 2003/00195* (2013.01); *A63F 2003/00381* (2013.01); *A63F 2003/00482* (2013.01);
(Continued)

(58) Field of Classification Search
None
See application file for complete search history.

(56) References Cited

U.S. PATENT DOCUMENTS 6,561,513 B1 * 5/2003 DeGeorge ........... A63F 3/00075
                                                            273/262
6,938,899 B2 * 9/2005 Kenney ............... A63F 3/00075
                                                            273/146
(Continued)

OTHER PUBLICATIONS

The Settlers of Catan: Game Rules & Almanac, Klaus Teuber, Sep. 20, 2007.

(Continued)

*Primary Examiner* — Ronald Laneau
(74) *Attorney, Agent, or Firm* — Naval Postgraduate School; Scott Bell

(57) ABSTRACT

A board game for simulating unconventional warfare. The board game of the present invention includes hexagonal territory board pieces, resource production unit markers, and infrastructure markers for representing territory, resource production units, and infrastructure in an unconventional warfare scenario. The infrastructure markers include (1) base markers that can be placed at intersections of the hexagonal pieces, where each base marker allows a player to collect double resources and build military units; (2) population influence markers that can be placed at the intersections, where each population marker allows the player to collect resources and conduct influence attacks on neighboring infrastructure; and (3) military unit markers that can be placed at the intersections, where each military unit markers allows the player to conduct military attacks on the neighboring infrastructure.

20 Claims, 8 Drawing Sheets

(52) U.S. Cl.
CPC ............... *A63F 2003/00785* (2013.01); *A63F 2003/00864* (2013.01); *A63F 2300/807* (2013.01)

(56) References Cited

U.S. PATENT DOCUMENTS

| | | | | |
|---|---|---|---|---|
| 7,371,165 | B2* | 5/2008 | Reizei | A63F 13/10 |
| | | | | 463/11 |
| 10,265,609 | B2* | 4/2019 | Maharbiz | A63F 3/00643 |
| 2003/0034606 | A1* | 2/2003 | Jacobs | A63F 3/00075 |
| | | | | 273/236 |
| 2003/0085520 | A1* | 5/2003 | Bedford | A63F 1/04 |
| | | | | 273/255 |
| 2013/0032999 | A1* | 2/2013 | Hildebrand | A63F 3/02 |
| | | | | 273/242 |

OTHER PUBLICATIONS

ARSOF 2022: US Army Special Operations Command, Apr. 18, 2013.
Dynamical model for gamification of learning (DMGL), Kim et al., Aug. 7, 2013.
United States Army War College: Strategic Wargaming Series—Handbook, Aug. 3, 2015.
War Gamers' Handbook, Nov. 5, 2013.

\* cited by examiner

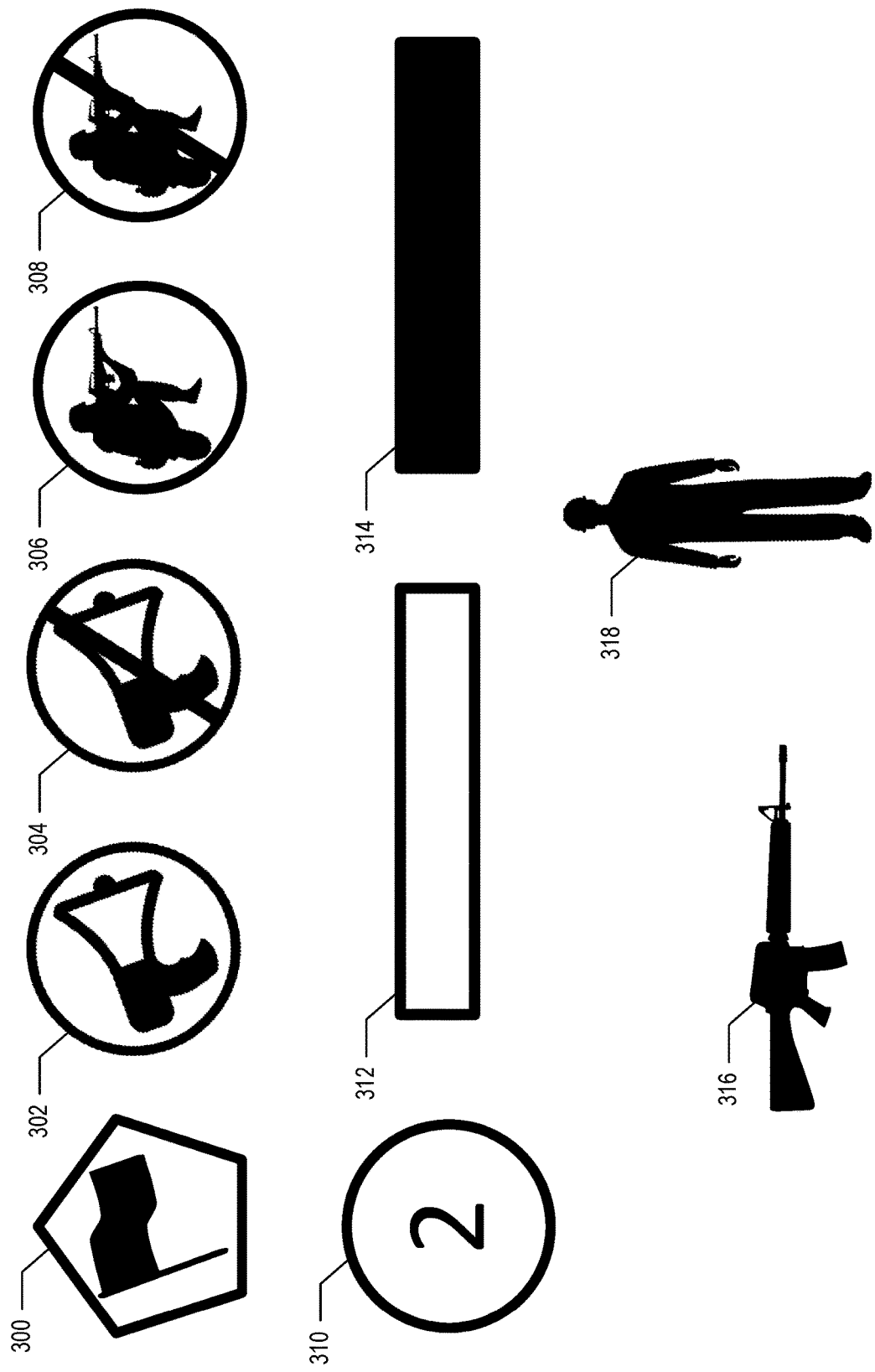

UNCONVENTIONAL WARFARE WARGAME

CROSS-REFERENCE TO RELATED APPLICATIONS

This application claims the benefit of U.S. Provisional Application No. 62/629,534, filed Feb. 12, 2018, which is hereby incorporated in its entirety by reference.

BACKGROUND OF THE INVENTION

1. Field of the Invention

The present invention relates generally to methods and systems for providing training in unconventional warfare.

2. Description of the Related Art

Wargaming has a long and colorful history dating back thousands of years, and the use of wargames to prepare for conflict has a deep lineage among military practitioners. Wargaming is a tried and true method of developing all levels of military leaders from tactical to strategic at a fraction of the cost of an exercise involving hundreds or even thousands of soldiers. According to the U.S. Army's Wargaming Handbook, "at its core, a wargame is a tool for exploring and informing human decisionmaking." A wargame is a simulation of a realistic situation structured around a particular problem set within a conflict. Wargames are designed to help military decision-makers better understand the constraints and principles of war in a hypothetical case.

There are two primary purposes for wargames, educational and analytical. Educational wargame provides players with decision-making experience, and analytical type wargames are designed to gain information and specific data that will assist commanders in making decisions. Most wargames educate players to some extent in the general dynamics of war, such as effects of terrain on maneuver, and the strengths and weaknesses of either attacking or defending units. Similar to traditional wargames recreational games also indirectly teach some military lessons. However, the primary focus of the recreational game design is a fun and interactive experience for the players.

An educational wargame differs in emphasis in that there are specific aims or lessons that the game facilitators want the players to learn by playing the game. While a well-designed wargame can and should be somewhat enjoyable, the focus is not solely entertainment, but specifically designed learning. Educational wargames are a form of active learning rather than passive absorption of a lecture. By nature, a wargame creates a real debate of ideas and strategies between players. This dynamic reinforces concepts experienced in the wargame much more clearly than a classroom lecture reviewing cause and effects of a particular military engagement. Successful wargames such as Kriegspiel became popular because they married entertainment value with education. Kriegspiel and the follow-on version Free Kriegspiel continued to reduce the tedious, cumbersome mechanics of early wargames with more rapid playable mechanics.

According to Webster's dictionary, the term gamification first began to be used in about 2010 and is currently defined as "the process of adding games or gamelike elements to something (such as a task) to encourage participation" . . . "[gamification] take[s] the boredom out of long training sessions by gamifying the entire process. A training manual is replaced by an interactive wargame that allows participants to win awards and be acknowledged." Many global brands regularly incorporate gamification in their marketing campaigns across the globe. These companies use game design and rewards such as badges and points to encourage people to do things they may not otherwise do. The early designers of Free Kriegspiel were seeking to make the task of maneuvering units more enjoyable and less rigid. By adopting a training tool such as the original Kriegspiel and making it more "fun," Kriegspiel became widely used, and many more officers benefited from its value.

Unconventional warfare (UW) is "activities conducted to enable a resistance movement or insurgency to coerce, disrupt, or overthrow a government or occupying power by operating through or with an underground, auxiliary, and guerrilla force in a denied area." The use of UW by a nation state or by rebels is not a new concept for waging war. Early civilizations understood the political utility of UW and used it to their advantage to subvert and coerce their opponents. Today, UW is a unique tool that is available to national decision makers to project national power and resolve conflicts. In certain circumstances, the use of UW may be the only viable policy option for a government. The option to employ UW exists when the situation dictates that the military action must be discrete, indirect, small-scale, and requires the use of indigenous actors.

An increased demand for UW in coming years is expected, and a deliberate uniformed educational tool is needed to ensure UW readiness.

SUMMARY OF THE INVENTION

Embodiments in accordance with the invention relate an UW wargame. The UW wargame is a board game for simulating unconventional warfare. The board game includes hexagonal territory board pieces, resource production unit markers, and infrastructure markers for representing territory, resource production units, and infrastructure in an unconventional warfare scenario. The infrastructure markers include (1) base markers that can be placed at intersections of the hexagonal pieces, where each base marker allows a player to collect double resources and build military units; (2) population influence markers that can be placed at the intersections, where each population marker allows the player to collect resources and conduct influence attacks on neighboring infrastructure; and (3) military unit markers that can be placed at the intersections, where each military unit markers allows the player to conduct military attacks on the neighboring infrastructure.

In some embodiments, the board game also includes logistic network markers for representing a logistic network and underground network markers for representing an underground network. The logistic network allows the player to move the military unit markers, and the underground network allows the player to move the population influence markers.

In some embodiments, some of the territory board pieces have designated populated areas, where each populated area allows the player to collect a personnel unit if a base or population influence marker is placed at the populated area.

In some embodiments, the board game also includes a weapon pool for holding weapon units that are purchased with resource production units at a weapon conversion rate.

In some embodiments, the player can use some of the personnel and weapon units to purchase the military unit markers.

In some embodiments, the board game also includes external support ports (ESP) board pieces that are placed around the territory board pieces, where each ESP board piece allows the player to trade resource production units for personnel units or weapon units at a corresponding trade conversion rate.

In some embodiments, the players of the board game include at least one state player and at least one insurgent player, where an insurgent player has a lower investment cost and a lower maintenance cost than a state player for each different infrastructure type.

In some embodiments, each base marker is worth two victory points, each population influence marker is worth one victory point, and each military marker is worth one victory point, where the player is victorious when the total victory points exceeds a victory threshold for a complete turn of the unconventional warfare scenario. The player can also be victorious when the player has the most victory points and a set number of complete turns of the unconventional warfare scenario have been completed.

In some embodiments, a military unit marker is disrupted when the military unit marker takes two hits during a complete turn of the unconventional warfare scenario, wherer the disrupted military unit marker is no longer able to conduct the military attacks.

Embodiments in accordance with the invention are best understood by reference to the following detailed description when read in conjunction with the accompanying drawings.

BRIEF DESCRIPTION OF THE DRAWINGS

FIG. 3 illustrates markers for an UW wargame.

Figure 1:
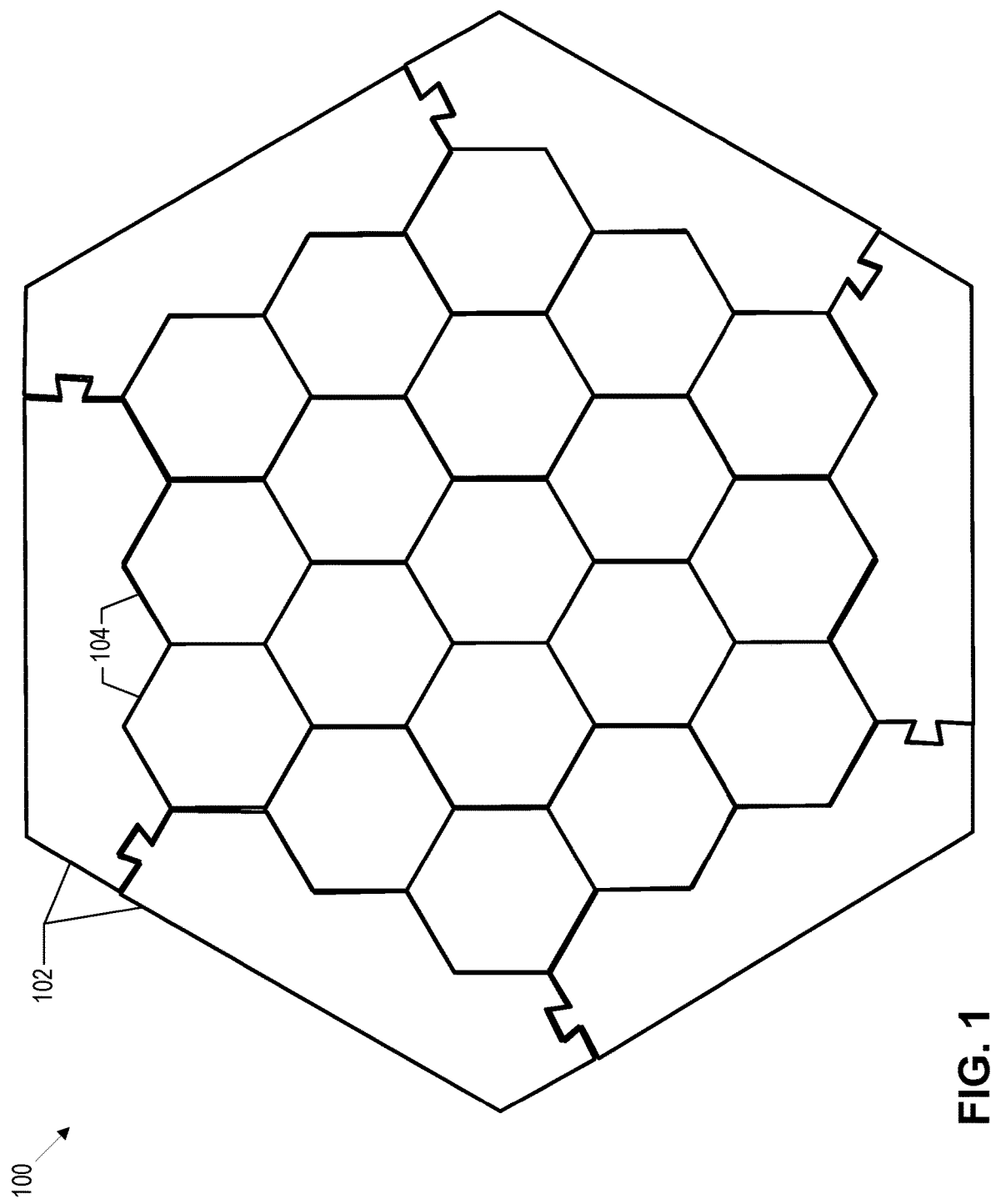
FIG. 1 illustrates a blank board for an UW wargame.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide an UW wargame.

UW is a unique tool that is available to national decision makers to project national power and resolve conflicts. The option to employ UW exists when the situation dictates that the military action must be discrete, indirect, small-scale, and requires the use of indigenous actors. Embodiments described herein are designed to simulate seven components of a resistance or insurgency. The seven components included in the wargame are the three primary components of underground, auxiliary, guerrillas; and four additional components; area command, area complex, population, and guerrilla base.

These components are designed to be self-sufficient, cellular, and redundant in an effort to make them more effective and to conceal them from the government. Even though they are cellular, all three primary components must work in concert in order to synchronize their effects against the state or occupying power. The three different components will share a common goal of overthrowing a government or expelling an occupying power. The different components of the organization do not come from three separate groups with competing agendas, but rather from a unified command structure that has a nested common purpose. The three components are better understood as different functions that support the overall goals of a resistance movement.

Underground—

The underground is a clandestine network within the insurgency that can operate in areas and by means that are denied to the guerrilla fighter. The underground enjoys this freedom of maneuver because the individuals are generally key respected members of society that operate within their daily pattern of life. The underground also maintains anonymity from the insurgency by delegating some of their tasks to the auxiliary as needed. This unique ability allows the underground to perform key functions such as intelligence, sabotage, and propaganda operations against the government. These operations against the government are generally most beneficial when they are executed near urban areas. This proximity to population centers allows them to effectively influence the human domain. This influence of the population will increase support to the resistance movement and cause the government to appear illegitimate. The underground may gain influence by conducting information operations or by acting as a shadow government providing essential services that the legitimate government is incapable of administering.

Auxiliary—

The auxiliary provides active clandestine support to the insurgency and should not be thought of as a separate entity, but as an individual providing a specific function to the resistance. The auxiliary generally performs the more menial task for the insurgency such as logistics, early warning for clandestine bases, intelligence collection, and propaganda distribution. Even though these tasks may seem mundane, the auxiliary networks are a key part to the survival and operational success of any resistance movement. The auxiliary networks are critical for moving fighters around the battlespace and to distribute resources throughout the resistance organization. The functions of the auxiliary and the underground may overlap in some circumstances providing redundancy in the organization. Auxiliary networks may operate in more rural areas and its members often have more of a part-time role in the resistance movement. Historically, the auxiliary tends to be the most expendable component of the movement because of their role and their overlap in capabilities with the underground. As the world becomes more populated, auxiliary networks are equally useful and active in both urban and rural environments.

Guerrilla—

The guerrilla component is the military action arm of the insurgency that engages in combat operations and is the most recognizable element of the insurgency. The guerrilla fighter is often outmatched by the state when it comes to military prowess and thus employs an indirect approach toward combat operations. This tends to offset the state's strength and can give the guerrillas the military advantage during engagements. Initially, the guerrilla fighter must employ ambushes, assassinations, and sabotage operations when challenging the state. The guerrilla must avoid decisive engagements and should only confront the state when it has an obvious tactical advantage, usually involving surprise. The guerrilla fighter can only achieve this advantage in areas where the resistance movement has influence which fosters clandestine support to the cause creating the desired favorable tactical environment. The resistance movement must continue to cultivate this support from the local population in order to increase the guerrillas' numerical size and operational effectiveness. This growth and development can eventually give the guerrillas the ability to challenge the government's forces in a larger and more open manner, but this should only be done if the guerrilla can appear to win the engagement.

The State—

This player will serve as the "government or occupying power" during the UW wargame. This player will follow all the same rules as the non-state; however, the state does begin with twice the infrastructure and has a different set of prices for their units (see invest in infrastructure phase 606 described below with respect to FIG. 6). This increased cost reflects the higher costs the state incur while conducting security operations due to the equipment and formations of conventional security forces and the simultaneous drain of resources supporting other governance requirements. The state does not have a physical presence across the entire board; however, due to the open nature of this UW wargame, the occupying power can observe resistance forces in his area of influence.

Non-State—

The non-state player represents a resistance movement or insurgency, whose aim is to disrupt or overthrow the state player. The player will do this by using "subversion and violence to seize, nullify, or challenge political control of a region." This player will follow all the same rules as the state player. A non-state player may choose to fight or not fight whomever they decided, as well as partner/ally with whomever they wanted.

Area Command—

The area command is the leadership element of the resistance that directs operations and supports all activities within its area of operation. This leadership element is under the control of a single commander and his staff. They are ultimately responsible for the success or failure of the movement. Their primary function is to synchronize all of the resistance's activities to include, but not limited to kinetic operations, logistical support, propaganda, and intelligence operations. This is done to achieve the desired effect and to ensure that all activities are nested with one common purpose. The area command can be further subdivided into sectors to facilitate its operational control of a region. In order to be effective, the area commander and staff need to be located in an area that is outside of reach of the government.

Area Complex—

The area complex is a group of clandestine networks located in a denied area that facilitates resistance movement operations. The area complex is under the jurisdiction of the area commander and conducts operations to support the commander's intent and goals. In order to support the commander's intent, the area complex must consist of intelligence, propaganda, logistical, and security networks. The area complex provides the insurgent with freedom of maneuver throughout the government-controlled area. The area complex also exits in both urban and rural environments.

Population—

The population, which is sometimes referred to as the mass base, has not historically been considered a component of a resistance or insurgency. The population can be unwittingly manipulated to perform certain actions against the state and therefore cannot be considered a traditional component of a resistance because they are not providing the movement with direct support. This additional component is worth discussing and planning for, since the mass base is where the resistance movement will draw much of its indirect and direct support. Population support can be in the form of something tangible such as providing resources or fighters to the cause. Support can also be in the form of leveraging emotional dissatisfaction toward the enemy. Resistance forces can infiltrate and manipulate respected civil institutions in an attempt to exacerbate existing grievances with the government. Once the resistance force is inside a civil institution it can convince its members to protest, riot; conduct a work stoppage, or any other form of sabotage against the state's functions. This is an effective way for the resistance to conduct a covert activity that can disrupt the government.

Guerrilla Base—

A guerrilla base is infrastructure often in a safe haven that allows the guerrilla fighter to rest, train, and plan for future operations. A guerrilla base needs to be in an area where the resistance has strong support of the local population and in a location the government cannot find or easily access. The guerrilla base provides the insurgent with the necessary safe haven vital to conducting strategic planning and long-term sustainment operations. The guerrilla base can be located in either a rural or urban area. Bases in urban areas tend to be more challenging regarding security, however, more easily logistically supported. The security requirement can be obtained and maintained as long as the state is reluctant to lose troops or public support by entering the area with the guerrilla base. The resistance force can increase the state's aversion to contesting a known guerrilla base location simply by maintaining strong local popular support around the base.

External Support—

Although not technically an additional component of an insurgency, external support is still considered key to successful insurgencies according to doctrine. Generally, resistance movements will not succeed without some assistance from an external actor. This external support can come from a state or from a non-state sponsor. These actors fill a gap that exists within the resistance movement that may be preventing it from reaching its objectives. This support can be in the form of money, weapons, capabilities, expertise, or personnel. A state sympathetic to the resistance may also give an organization sanctuary within its borders to conduct guerrilla base operations. A third-party actor to the conflict can help to sustain a resistance movement and may provide a resistance force military parity with the opposing government in combat operations. Overt support from a third-party nation-state may provide credibility to the insurgent's cause which may promote legitimacy on the international stage. This political support can put international pressure on a government or occupying power to give concessions to the resistance and in effect strengthen the movement's overall position. Often the support from external actors is the final ingredient needed to tip the balance into the favor of an insurgent movement.

External actors providing support to an insurgency have some common interest with the resistance movement which is why they decide to get involved in the conflict. These activities are commonly in line with a geopolitical strategy that the third-party actor is trying to obtain. This involvement is beneficial as outlined above, however, can also be problematic or limiting for the resistance movement. The external actor may attempt to exert direct influence or control over the resistance movement. This authority is done to prioritize the objectives of the third-party actor over the goals of the insurgency. Strong external support can also make the resistance movement look like a puppet regime for the third-party nation-state and cause the movement to lose legitimacy in the eyes of the local populace. Even more problematic is when a resistance movement partners with an organized crime element such as a narco-trafficker. This partnership is typically done to generate much-needed capital for their revolution. These illicit organizations tend to only care about their bottom line which is to create wealth and are not overly concerned with governance. In fact, these illegal agencies may only benefit when the government is in a weakened unstable state. This partnership may make the resistance movement appear to be illegitimate which can cause it to lose popular support both locally and internationally.

Embodiments described herein are designed to capture three fundamental doctrinally based learning objectives. First, the UW wargame provides a platform to practice developing the area command through the construction of the area complex; players must balance the interdependence of base and military unit development with organizational expansion through influence. Second, the UW wargame teaches the importance of managing resources within a resistance or state force. Third, the UW wargame illustrates the importance of resistance group cooperation and coordination if the resistance groups are going to be ultimately successful in defeating their oppressors.

The UW wargame incorporates the three primary components and four additional components of insurgency or resistance addressed in *Unconventional Warfare: Army Techniques Publication* 3-05.1. These components are incorporated to achieve the three learning objectives and avoid excessive complexity. The three primary components are underground, auxiliary, guerrilla force; and the additional components in this wargame are population/mass base, guerrilla base, area command and the area complex.

The UW wargame fosters an environment for soldiers to share past experiences and expertise in a natural, low threat environment, which engages the soldier's minds more than a typical classroom environment. Each soldier can be his/her team in the UW wargame and have the ability to lead a force and learn through hands-on experience how to manage the complex and ever-changing UW environment.

The UW wargame is a multi-sided system wargame involving four players. Three of the players manage non-state or resistance organizations, and one player leads the state or occupying power. Each player must develop the area complex through the auxiliary and underground networks, build combat power, and influence local populations using the seven components of UW directly from doctrine as discussed below. Players will operate their resistance organizations by efficiently managing the economy of money, weapons, and people. The objective of the wargame is to be the first player to build a team that is worth 15 victory points. Each player earns two victory points for each base they construct and one point for each guerrilla force and influence marker that is active on the board. To balance and maintain realistic conditions, the state player begins with twice the amount of infrastructure as the non-state players; however, all players must earn 15 victory points to win, and each player must manage their organizations using the same three components of the economy.

FIG. 1 illustrates a blank board for an UW wargame. In this example, the UW wargame board 100 is roughly 24×24 inches square that can fit on any conference table. The construction of the board is of hexagonal pieces (hexes) 104. This design allows for randomization for each wargame. This board design also enables the wargame facilitator to customize the board to reflect a concentration of population centers in some portions of the board and more rural environments in other parts of the board depending on the specific training objectives of that particular iteration of the UW wargame.

Along the edges of the board, there are several External Support Ports (ESPs) pieces 102. The ESP pieces 102 enable each of the players in the conflict region to reach out to the external world to both trade for needed resources and to bring in foreign support. External support reduces operational cost for players and represents both political and tangible/physical resources. While not essential for a resistance movement, external support is beneficial and can often provide the resources necessary to shift the balance of a conflict.

Figure 2:
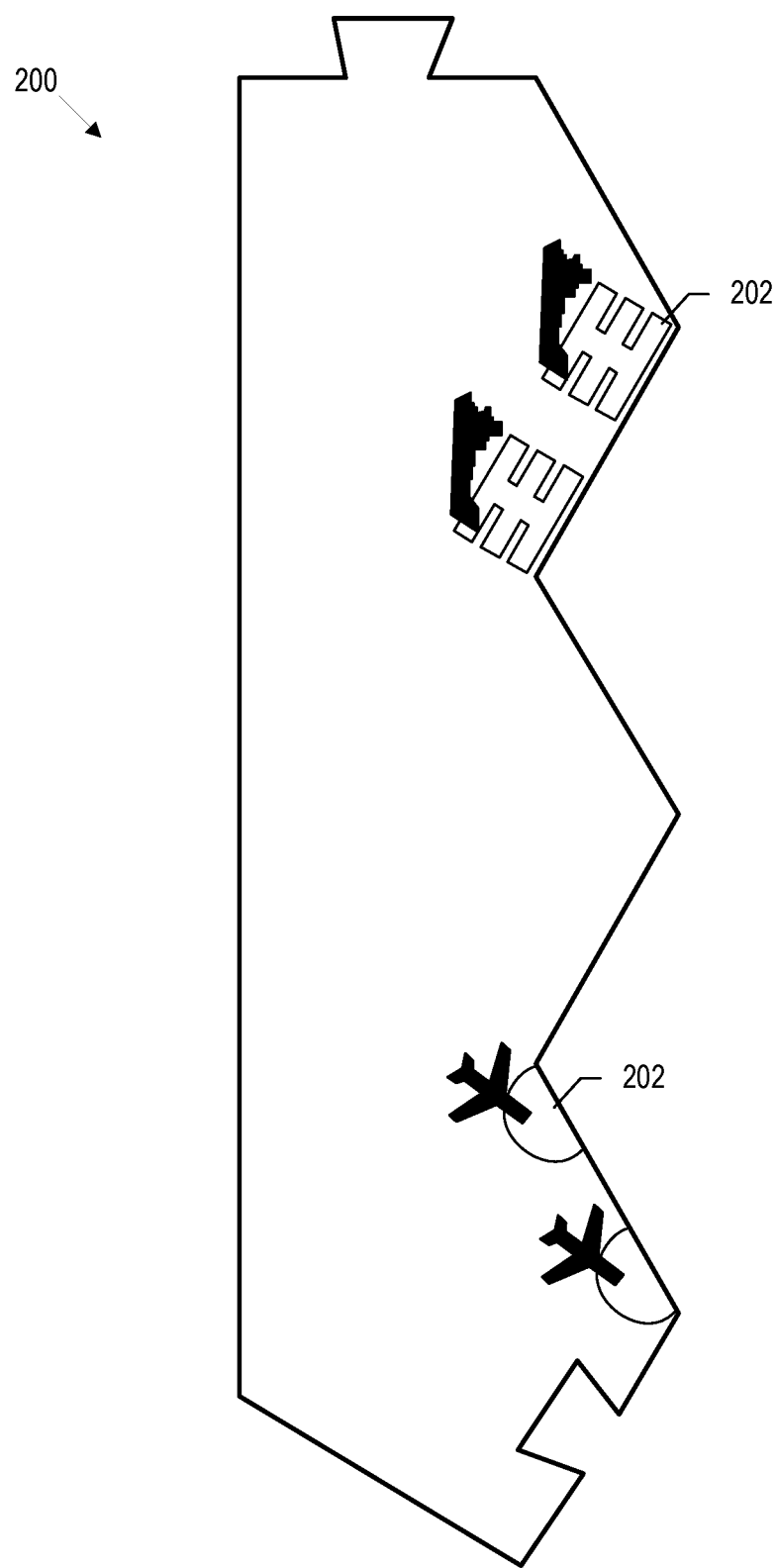
FIG. 2 illustrates an external support port (ESP) board piece for an UW wargame.

FIG. 1 shows a board design with six ESP pieces 102 along the outer edges of the board 100. A more detailed ESP 200 is shown in FIG. 2. Each ESP piece 200 can have one or more foreign ports 202. All these foreign ports 202 have the same effects for each of the players to standardize the wargame experience for each of the players. In the embodiment shown in FIG. 6, there are 9 foreign ports 202 evenly distributed around the perimeter of the board 100. In other embodiments, there can be fewer foreign ports 202, and the effects of foreign sponsors and the international markets can vary based on turn and or players.

The ESP's 202 around the edge of the board represent the ability for organizations inside a conflict zone to find external supporters who will provide assistance. A player must establish influence or a base adjacent to one of the two piers/airports 202 to gain access to the ESP 202. ESP's 202 reduce the cost of all materials as shown in TABLE 5. In some embodiments as an optional rule restriction, players may trade resources with each other only if they physically have auxiliary or logistics connections, or if both players have ESPs 202 established.

FIG. 3 illustrates markers for an UW wargame. A Resource Production Unit (RPU) 310 represents economic productivity. Each of the hexes 104 has an RPU 310 placed on it to serve the resource production in dollars. The last phase of each player's turn is to collect the total RPUs 310 from all of the terrain which the player controls. The randomization of the RPU numbers on each of the board hexes 102 will add variation to the wargame to highlight varying economic values of terrain and can be increased or decreased to change the play of the wargame or represent a given area of the world. This method of resource allocation also enables the wargame facilitator to create more or less "productive" regions within the conflict area, while not subjecting the more impoverished areas to abject poverty.

Typically, four players/teams of players play the wargame. One player is the state, or counterinsurgent (COIN) player who is also the regional power and occupying government force. The other three players represent different non-state or rebellious insurgent groups working to gain combat power and influence. The wargame is played in turns which involve interpersonal coordination and collaboration of resources and strategy between allies if they should choose. There is no restriction on a player's alliance to include alliances with the state player.

In other embodiments, a scalable chart outlining the number of board tiles, ports, and resource production units required for an optimal 2, 3, 4 or up to 8 player wargame. The board is scalable due to the existing hexagonal design of the board. Modified ESP's 102 are used on the outer edge of the board to accommodate the different sizes of the board. Adding scalability for the numbers of players able to participate adds to the overall flexibility of the UW wargame.

There are seven pieces of infrastructure available for purchase, consisting of bases 300, population influence 302 (disrupted population influence 304 is described below), auxiliary or logistics network 314, underground or intelligence network 312, military units 306 (disrupted military unit 308 is described below), and weapons 316. Each unit's cost is displayed on the individual player's unit cost card. The international exchange represents the ability to buy or sell resources from any external third-party sponsor to the conflict. Each player can negotiate and trade resources with any of the other players during this phase of their turn. This player interaction is critical to the gameplay as it replicates the interconnectedness of contemporary conflict and enables players to work together or alone as they desire. Players are free to coordinate with any other players around the board to achieve their wargame objectives (discussed below).

The first foundational infrastructure for all organizations is the base 300 and second is the organization's influence 302 over population and resources. These two infrastructures serve to control terrain and populations by recruiting people 318 to the team and gathering financial resources. The player purchases and places guerrilla/training bases 300 in any region that the player controls. The base 300 is placed at the intersection of three hexes 104 to enable it to collect all three adjacent RPUs 310 and populations. The placement of a base 300 or influence 302 on an intersection represents in the real world the terrain that it controls. Following the initial base 300 that each player begins the wargame with, the player places all new bases 300 adjacent to friendly underground 312 and auxiliary networks 314.

The base 300 represents the "heart" of each player's organization. Each player's base 300 generates two times the posted resources from the surrounding areas. The base 300 receive resources from influenced areas via an uninterrupted logistics or auxiliary network. Bases 300 are necessary to train military units 306 (guerrilla or security forces), as well as provide resupply to all military units 306 via the logistics 314 and auxiliary network 312. It is possible for a player to continue playing the wargame without a base; however that player will not receive any production resources. If an allied player "liberates" a friendly player's base, the base is now usable on the next turn. Bases defend at 5-6 in combat and can sustain three hits during one turn. At the start of the next turn, a base is repaired automatically with no cost to the player. If multiple players attack the same base during the same turn, the hits are combined.

The second foundational piece is influence 302. The population influence 302 piece represents the underground or intelligence government cell, which can conduct governance, humanitarian aid, and information operation of all manners including but not limited to messaging, coercion, subversion, and sabotage. The player places the influence 302 infrastructure along any friendly underground or intelligence network. Influence infrastructure 302 can be moved from intersection to another each turn along any one friendly underground or intelligence network 312 to either generate resources for the organization or take part in a conflict. While the underground or intelligence network 312 is required for influence operations to be built and moved, the auxiliary and logistics networks 314 are still needed to transport the resources generated back to a friendly base.

Influence 302 represents all forms of underground/intelligence operations (i.e., messaging, coercion, sabotage, and disruption). Influenced areas generate resources, in addition to taking part in both offensive and defensive conflict. An influence infrastructure 302 generates the number of resources and number of people represented in the area being influenced (see description of collect new resources 616 phase below with respect to FIG. 6). An influence infrastructure 302 can move one space per turn. Influence 302 may withdraw from combat along underground 312 or intelligence networks 314 and can be disrupted 304 similar to military units 306. A player does not have to withdraw influence infrastructure 302 if it becomes disrupted 304 during a conflict. A player may choose to leave disrupted influence 304 in the enemy occupied area and regenerate it on a later turn if desired.

Underground or intelligence networks 312 are required to conduct any security or resistance operations. Underground networks 312 do not have a maintenance cost and cannot be destroyed or removed from the board unless the owner disbands them. In the event an underground or intelligence network 312 is cut off from its base, it merely remains where it is and can be used again if it is reconnected. Underground networks 312 are necessary for any influence operations. An underground/intelligence network must be traced back to a player's base or headquarters to sustain influence operations.

Auxiliary or logistics networks 314 are required to conduct sustainment and security operations. Like underground networks 312, logistics networks 314 do not have a maintenance cost and cannot be destroyed or removed from the board unless the owner disbands them. In the event an auxiliary or logistics network 314 is cut off from its base, it simply cannot be used before it is reconnected. Auxiliary/logistics lines 314 must be traced back to a player's guerrilla base or barracks to receive any benefit from resources or people from active influence operations.

The military unit 306 is the primary unit responsible for defending and also attacking adjacent organizations and threats. Any military unit 306 can conduct two actions during a player's turn. The military unit 306 may perform any combination of the following three activities: Move, attack, and defend (along logistics/auxiliary networks). In the event a guerrilla or security force 306 is defeated in conflict, the military unit 306 will withdraw and reflect any possible disruption 308 as defined by the results of the conflict (see resolve conflict phase 612 below as described with respect to FIG. 6). Military units 306 must trace an uninterrupted line of supply via an auxiliary/logistics network 314 back to any friendly base to be able to conduct offensive operations. If a military unit 306 becomes isolated and unsupplied, they may only defend their positions. In the event a military unit 306 is attacked and must withdraw, the unsupplied military unit must withdraw along an existing friendly aux/log route 314 regardless of whether the network is connected to a base 300 or not.

RPUs 310 represent the resource production of a particular hex tile 104 of the Board 100 and are represented in U.S. dollars. Each hexagonal board tile 104 will have an RPU 310 number assigned during the setup phase of the wargame. RPU markers 304 come with the numbers 1, 2, 3, and 4. Each influence 302 on the board will border three hexes 104 resulting in a collection of the total resources of all three hexes 104 each turn. A Base 300 will generate two times the resources from each of its adjacent hexes 104 effectively doubling the resource generation of influence 302. Each player can only collect the RPU 310 equivalent of one influence 302 or one base 300 for each specific location. For example, if a player has an influence 302 and a base 300 in the same location, the player will only collect 2× the posted resource production 310 because of the presence of the base. If there is more than one influence 302 in the same area, just one can collect the number of RPU's 310 listed in the three intersecting hexes 104.

People 318 identify the chips which represent recruited personnel at a player's disposal available for utilization in support of the organization. People 318 are used in all portions of the organization (see invest in infrastructure phase 606 described below with respect to FIG. 6).

Lastly, there are weapons 316 available for purchase. Each player should procure weapons 316 to arm and train their military units 306. As with other resources, external actors provide cheaper weapons 316 through a port 102. Weapons 316 are critical to maintaining the viability of a player's military fighting force 306. Weapons 316 can be stored indefinitely along with the RPUs 310 and people 318 generated from occupied regions. Weapons 316 can be represented by chips or some other type of counter. Weapons 316 are used for all military unit 306 creation and retraining in the event they are disrupted 308 in combat. The cost to reconstitute a disrupted military unit 308 is described in the infrastructure phase 606 below for FIG. 6.

Figure 4C:
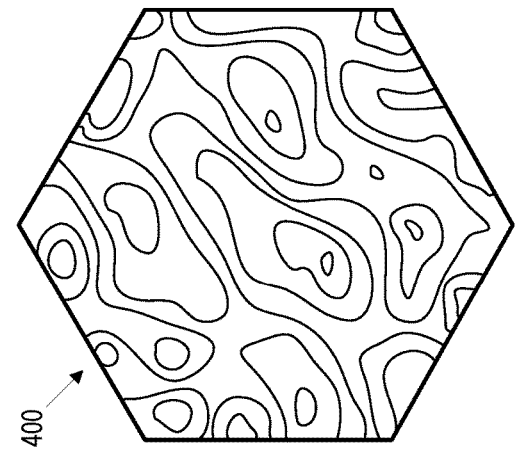
FIGS. 4A-4F illustrate territory board pieces for an UW wargame.
Figure 4F:
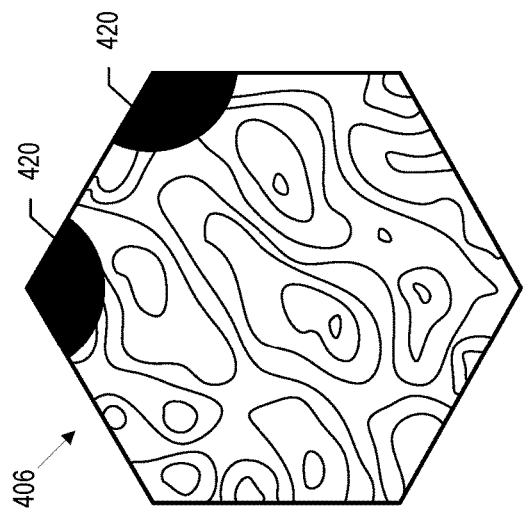
Figure 4B:
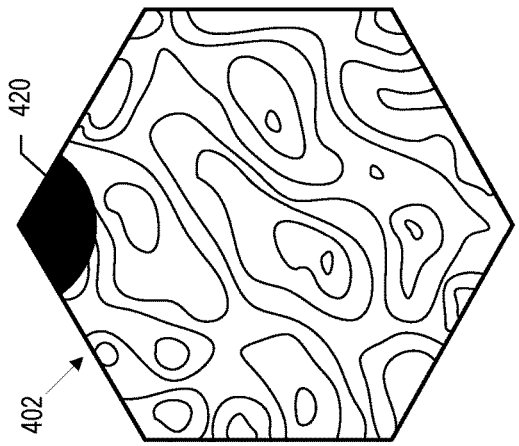
Figure 4E:
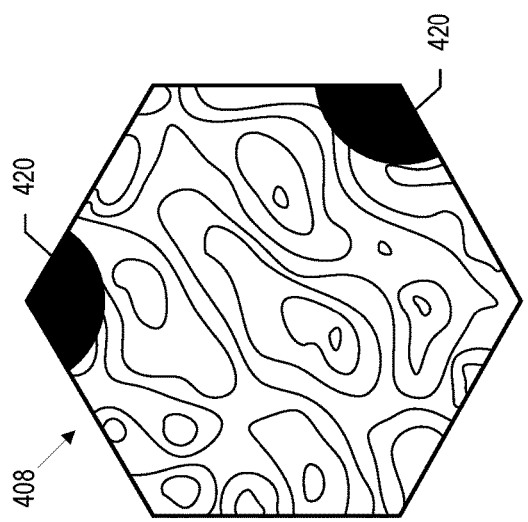
Figure 4A:
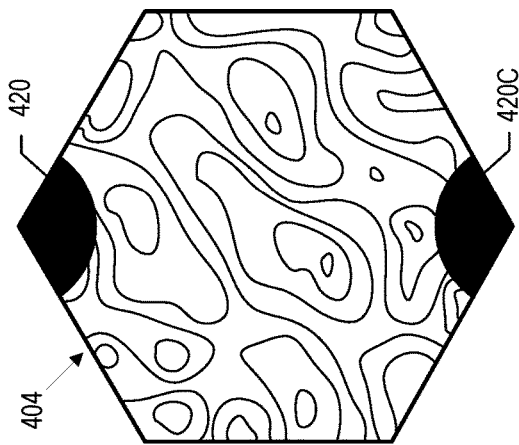
Figure 4D:
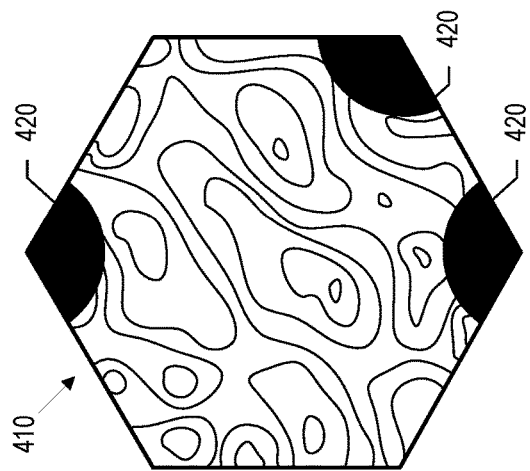

FIGS. 4A-4F illustrate territory board pieces for the UW wargame. Some of the territory board pieces (hexes) have populations centers, which are depicted as filled vertices. When infrastructure is positioned on a population center 420, the corresponding player can recruit people from the population center 420. FIG. 4A shows a hex 400 with no population centers. FIG. 4B shows a hex 402 with a single population center 420 on the North vertex. FIG. 4C shows a hex 404 with two population centers 420 on the North and South vertices. FIG. 4D shows a hex 406 with two population centers 420 on the North and Northeast vertices. FIG. 4E shows a hex 408 with two population centers 420 on the North and Southeast vertices. FIG. 4F shows a hex 410 with three population centers 420 on the North, Southeast, and South vertices.

Each population center 420 in the corner of a board tile represents one person for resource generation. The maximum number of population centers 420 that one influence 402 or one base 300 could effect is three when all three board tiles have populations at the same intersection. The people who are recruited from each population center 420 represent individuals who join the resistance or state organization due to the influence that is being applied in that specific area.

The hexagonal board design allows the board to be set up in numerous configurations. The design intent is to create a playable wargame that would not result in one dominant strategy. In some embodiments, a more concentrated population area board designs led to a more rapid network development due to the increased population resources available. Board designs with fewer concentrations of the population took longer to develop networks due to a shortage of population centers' 420 resources. Board designs that have only a few "two-population" intersections and many single population areas are very slow in the beginning few turns and took roughly 3-4 turns for organizations to begin to grow beyond their initial setup. After play-testing, wargames are typically played with a minimum of two three-population center 420 intersections and many two-population center 420 intersections. This board design led to a noticeable variation in population densities across the board, which drove players to compete for the high production regions and avoids the regions with no populations at all. A wargame facilitator can choose to make players operate in a sparsely populated area to teach specific lessons, or specifically align the board to have many "urban areas" or three-population center 420 intersections.

The higher the numeric values for production on each territory board piece, the more quickly players can amass financial resources, accelerating network development. Initial embodiments used only three number #3 production markers and then an even split of #2 and #1 production markers, which resulted in very slow wargames because players could not generate adequate amounts of resources in a reasonable time. Later embodiments introduced two to three #4 production markers and three to four #3 production markers, which led to a noticeable increase in the rate of network development for each of the player's organizations. As with the population density, the resource production markers can be precisely aligned to create more valuable terrain and less costly terrain. Any wargame facilitator can customize the production levels to achieve the desired learning effects, or just to progress the wargame at a faster rate.

Figure 5:
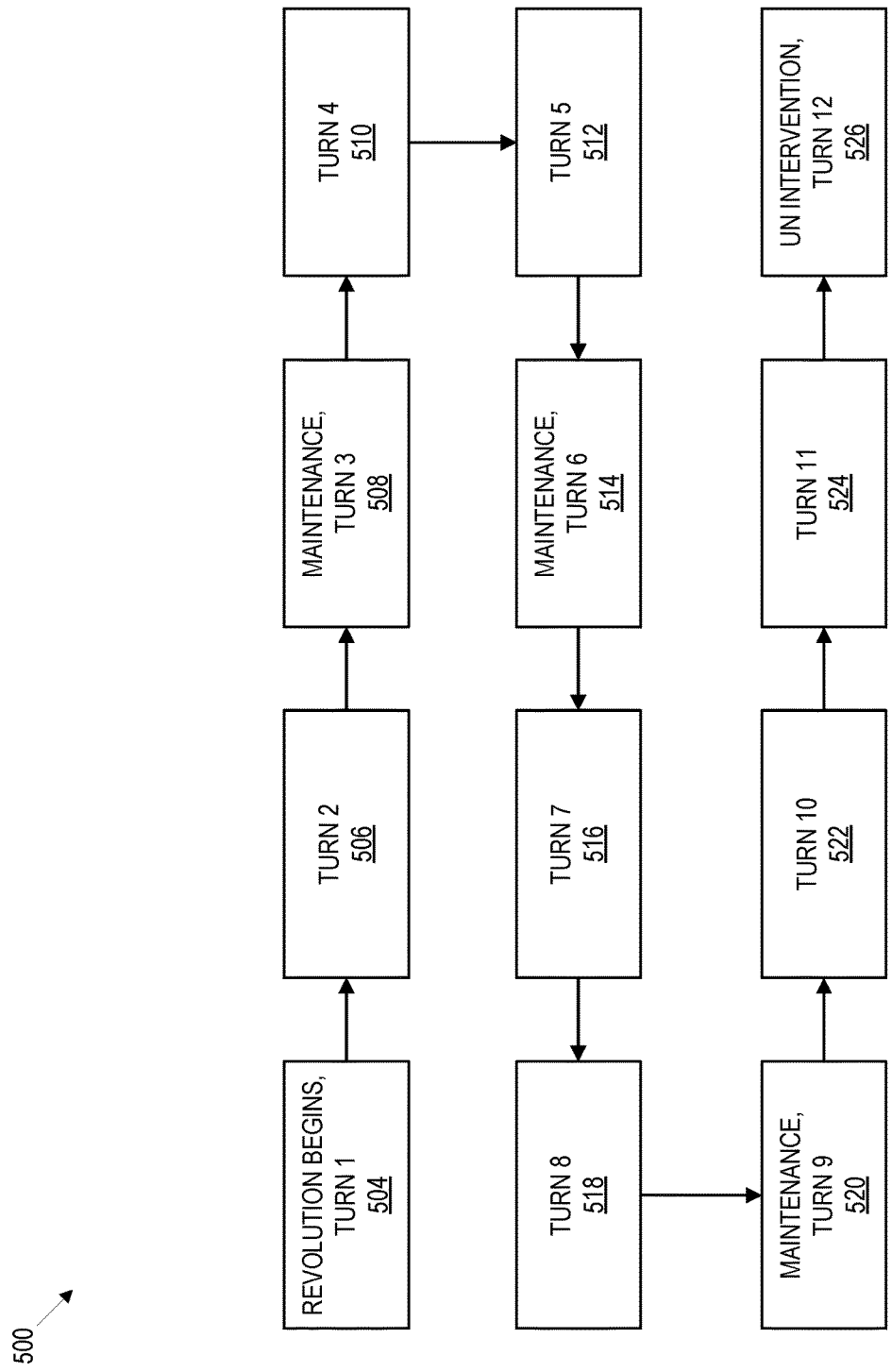
FIG. 5 illustrates a workflow for the turns during an UW wargame.

FIG. 5 illustrates a turn tracker board 500 for the turns 504-526 of the UW wargame. Each turn is divided into seven phases, which are described below with respect to FIG. 6. Players will each play through the seven phases of each turn in sequence in a clockwise rotation (in the same order of laying down the initial infrastructure). One wargame turn 504-526 is completed when each player has completed all of their specific phases in order. Example player one will play through their phases followed by player two, three, and lastly player four. All following the sequence of seven phases described below with respect to FIG. 6. After all four players have completed their phases; the turn marker is moved on the turn tracker board to the next square. All bases are considered full strength at the beginning of each turn regardless of the level of damage incurred during the preceding player's collective conflicts.

The revolution begins in turn 1 504 and proceeds through each turn until ending at United Nations (UN) intervention on turn 12 526, unless the game ends earlier due to a player achieving a win condition. During turn 3 508, turn 6 514, and turn 9 520; each player is required to pay for the maintenance of their infrastructure (see maintenance phase 604 of FIG. 6).

Figure 6:
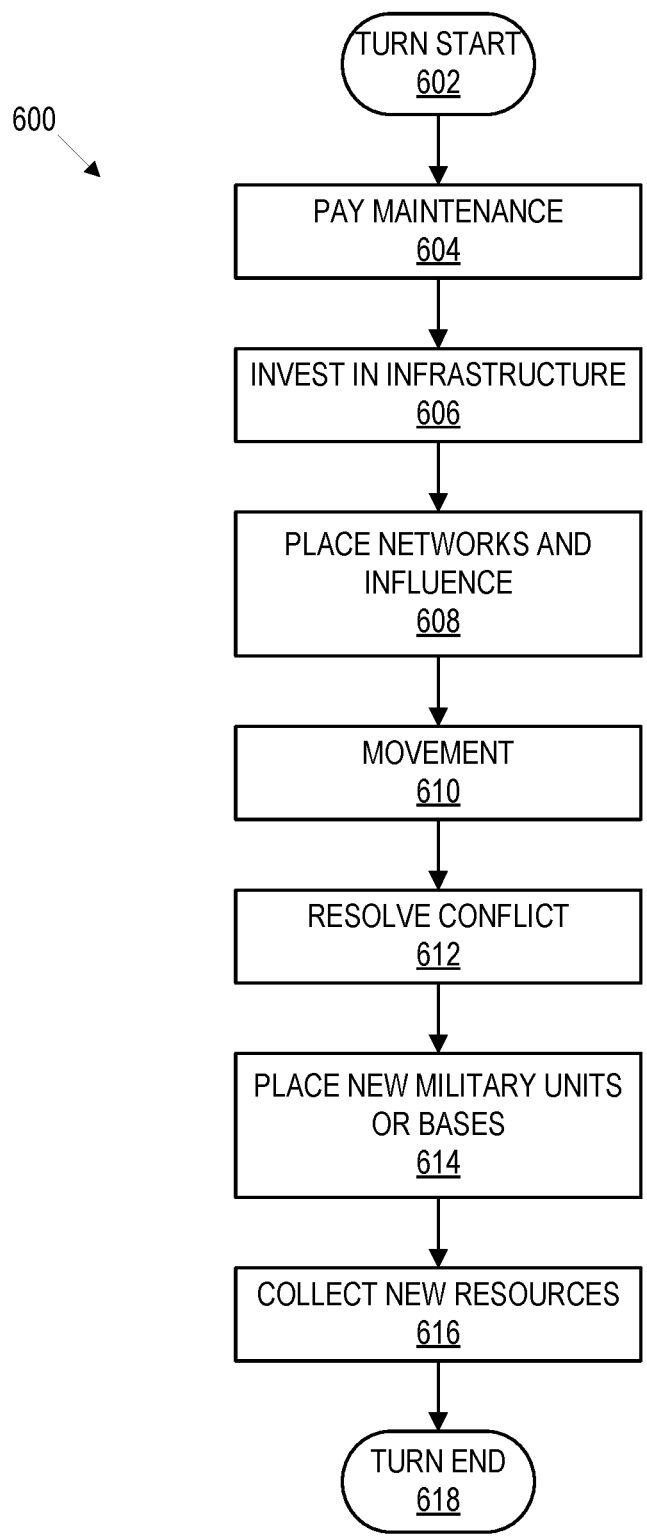
FIG. 6 illustrates a workflow for the phases of a player's turn in an UW wargame.

FIG. 6 illustrates a workflow for a player's turn in the UW wargame. In the UW wargame, there are seven phases to each player's individual turn: (1) pay maintenance 604, invest in new infrastructure 606, place networks and influence 608, movement 610, resolve conflict 612, place new military units or bases 614, and lastly collect new resources 616. As is the case with the other processes described herein, various embodiments may not include all of the phases described below, may include additional steps, and may sequence the steps differently. Accordingly, the specific arrangement of phases shown in FIG. 6 should not be construed as limiting the scope of the UW wargame.

When indicated on the turn tracker (e.g., every third turn), each player must pay the requisite maintenance cost for their organization and networks according to the maintenance cost chart (see TABLE 1 for State Cost and TABLE 2 for Non-state Cost below) during the pay maintenance phase 604. This recurring cost represents the ongoing cost of maintaining infrastructure of an effective organization no matter what side of the conflict a player is on.

TABLE 1

Maintenance Cost for State Player

| Unit Type | Money |
|---|---|
| Influence 302 | 4 |
| Fighters 306 | 4 |
| Base 300 | 8 |

TABLE 2

Maintenance Cost for Non-state Player

| Unit Type | Money |
|---|---|
| Influence 302 | 2 |
| Fighters 306 | 2 |
| Base 300 | 4 |

During the invest in infrastructure phase 606, each player can choose what new infrastructure they wish to invest in. New infrastructure can be paid for using the available RPUs, personnel, and weapons. During this phase 606 the purchasing player is able to trade resources with other players as well as on the "international market" through an ESP 102 if their organization has gained an international sponsor. Each player's area command must balance and synchronize investment so that the organization does not have excess in some areas and shortages in others.

Each player will have a player purchase card detailing the cost of each available item for that player. There is a difference in costs between the state (TABLE 3) and the non-state players (TABLE 4). If players have access to an ESP 102, they may obtain resources from international trade by exchanging supplies on hand for new supplies (TABLE 5).

TABLE 3

Unit Cost for State Player

| Infrastructure Type | People | Money | Weapons |
|---|---|---|---|
| Weapons 316 | 0 | 8 | 0 |
| Base 300 | 17 | 45 | 0 |
| Intelligence 312 | 2 | 15 | 0 |
| Logistics 314 | 2 | 10 | 0 |
| Military Unit 306 | 8 | 15 | 8 |
| Influence 302 | 8 | 25 | 0 |

TABLE 4

Unit Cost for Non-state Player

| Infrastructure Type | People | Money | Weapons |
|---|---|---|---|
| Weapons 316 | 0 | 5 | 0 |
| Base 300 | 10 | 30 | 0 |
| Intelligence 312 | 1 | 10 | 0 |
| Logistics 314 | 1 | 5 | 0 |
| Military Unit 306 | 5 | 10 | 5 |
| Influence 302 | 5 | 15 | 0 |

TABLE 5

International Trade Exchange Rates

| Resource Type | People | Money | Weapons |
|---|---|---|---|
| People 318 | 1:1 | 1:5 | 1:2 |
| Money | 5:1 | 1:1 | 3:1 |
| Weapons 316 | 2:1 | 1:3 | 1:1 |

The cost of restoring a disrupted unit 304, 308 is half of the initial unit cost from TABLE 3 or 4 rounded up.

During the place networks and influence phase 608, any new auxiliary/logistics or underground/intelligence networks purchased during invest in new infrastructure phase 606 are placed along the hex 104 edges. Any new or reconstituted influences will also be placed during this phase 608, and are available for use immediately during the next phase (movement phase 610). The order of phasing is critical because an area command is able to invest in networks, and immediately put those networks to use before an adversary is able to respond to the network expansion. Due to the open nature of the wargame design, there are no secret networks, so in order to facilitate some degree of surprise, which is critical for an insurgent or resistance group, the networks are usable immediately.

During the movement phase 610, each player moves any or all available units to the desired locations within the individual movement allowances. All movement takes place along the hex 104 edges where there are existing networks 312, 314. Units 306 may not move if they are being reconstituted that turn and units 306 may take part in conflict after moving their full movement allowance. Fighters 306 can move a maximum of two spaces along auxiliary/logistics networks 314. Influence 302 can move one space along an underground/intelligence network. Any military unit 306 that is being reconstituted must be positioned on its respective network 314 at the beginning of the turn and will use all its movement authorization in the reconstitution effort (i.e., cannot move, or fight, during the player's turn). An influence 302 that is reconstituted after being previously disrupted in enemy occupied territory cannot move and will be forced into conflict during the resolve conflict phase 612.

During the resolve conflict phase 612, any conflict that has resulted from the movement phase 610 is now adjudicated according to the engagement table found on the player chart shown below in TABLE 6. Specifically, players choose which casualties their side will take in response to the number of "hits" from the engagement table. Each player will disrupt influence 304 and military units 308 and withdraw any surviving military units 306 as necessary. (See engagement TABLE 6 below for further clarification.)

Players may engage other players with influence 302 and military units 306, or a combination of both. The attacker must have fully supplied forces with active underground 312 and auxiliary networks 314 back to a base 300. The attacker always rolls first, where one dice is rolled for each attacking unit. Following the attacker rolling one dice for each of the attacking units, the defender will roll one dice for each of their defending units. In order for the attacker or defender to gain affects i.e., "hits," they must roll what is specified in the engagement TABLE 6 below.

TABLE 6

Engagement Table

| Unit Type | Hit Roll |
|---|---|
| Influence 302 | 5-6 |
| Fighters 306 | 4-6 |
| Base 300 | 5-6 |

Any other number rolled results in a miss (i.e., no meaningful effects against the enemy). Following both the attacker and defender rolling their dice, each player determines their own unit's casualties from the effects of the engagement. Both influence 302 and fighters 306 can withstand two "hits" each, and a base can withstand three hits. The first hit results in the unit's 302, 306 disruption, and the second hit results in the unit's 302, 306 removal from the board unless it is the base 300 which can sustain three hits before being destroyed and removed from the board. Military units 306 and influence 302 can withdraw after any round of battle along an existing network according to normal movement rules. Influence units 302 may remain disrupted in "enemy controlled areas." Only units 302, 306 that are not disrupted may continue to attack. An attacking unit may occupy new territory even if they are disrupted during the conflict as long as the defending unit is forced to withdraw, or enemy influence is disrupted and no longer effective. Bases 300 are destroyed after incurring a total of three hits in one turn. Any hit "battle damage" sustained by influence 302 or fighters 306 can be repaired by paying 60% of the original cost of the unit. Bases 300 are automatically repaired at the beginning of each turn when the turn marker moves. If multiple players attack the same base 300 during the same turn, the hits are combined.

During the place new military phase 614, any new military units 306 or bases 300 that were purchased at the beginning of the turn during the "invest in new infrastructure" phase 606 are placed on the board. Players can only place military units 306 in a base 300. The player must put bases 300 at any junction or port connected via auxiliary/logistical 314 or underground/intelligence networks 312. The base 300 and military units 306 are not immediately available for use like the networks 312, 314 and influence 302 because in general these elements of infrastructure require more logistical support and specific training to become operational. Efficient military units 306 and robust reliable, bases 300 do not just appear out of nowhere with little time and effort.

During the collect new resources phase 616, each player will tally the number of RPUs 310 that their organization controls and collect the requisite amount of resources 316, 318. All newly placed infrastructures immediately produce resources. Each player will use the designated personnel 318 and weapons markers 316 provided to delineate stored resources represented by chips. For example, white represents one item, red represents five items, and blue represents ten items. RPUs 310 are denoted in dollars and are also collected at this time.

In some embodiments, the UW wargame is designed to last less than four hours through either a decisive or arbitrated outcome. A wargame facilitator can explain the wargame rules and provide a tutorial of the wargame mechanics in 60 minutes. This time enables all players to understand the rules, identify their entire wargame infrastructure, and observe a short demonstration of how the mechanics of the UW wargame play out. Following the completion of the wargame, the wargame facilitator can host a discussion highlighting fundamental concepts that came out of this educational wargame, inviting each player to share their lessons learned from their experience commanding their organization.

There are at least two ways for players to win the UW wargame based on victory points awarded for specific types of infrastructure. For example, a first method for winning the UW wargame is a decisive victory by being the first player to gain and maintain 15 points for one complete turn. Any player with 15 points is in a strong position economically and militarily. Through playtesting, when a player gains and maintains 15 points for one complete turn, that player is in the dominant position to carry the campaign on to overall success. The second method of victory is to have the most points by the 12th turn 526 of the wargame, which is marked "UN Intervention" on the turn tracking board 500. This victory condition represents the historical fact that 33% of insurgencies end in negotiated settlements due to a fundamental stalemate. The strength and influence of each organization is vital to any power-sharing agreements that result through international arbitration (i.e., UN intervention). Players with the most points can gain the most favorably negotiated outcomes because they are negotiating from positions of strength.

Points are awarded as follows: two for each base 300, one for each active influence 302, and one for each active military unit 306. Customized victory points may be defined explicitly by the wargame facilitator before the beginning of each wargame if there are specific learning objectives. The default scoring of 15 points encourages players to be purposeful in their organization growth and flexible enough to be accomplished in a variety of strategies. No single plan will enable a player to win each time, and a strategy that worked during one wargame with one group of players and one board design may not work a second time with another team and different board set up. The 12-turn limit to the wargame has been implemented to bring the wargame to a close and enable time for purposeful postgame discussion. After the players have each taken 12 turns, even if they have been unable to achieve a decisive 15-point victory, they should have a good understanding of each of the three primary learning objectives the UW wargame is seeking to reinforce.

The scoring in the wargame is designed to place value on specific critical pieces of infrastructure within an organization, and ultimately to create conflict on the board as players have an objective to aim their strategy toward. In some embodiments, the scoring could be modified to include adding point values to more pieces of infrastructure and/or point values to geographic terrain. Each additional rule requires additional computation for the players to mentally track while playing the wargame. A digital version of the wargame would alleviate this added computation challenge and make complicated scoring more playable. A subset of the overall point allocation and scoring is that statistically the state players win only 20% of the time. Typically in the wargames, the three non-state players eventually work together to counter the state's efforts, resulting in the low state win rate. In some embodiments, this balance of play in can be modified using different scoring techniques. Also, changing the state's cost for infrastructure during initial setup could also shift the balance of play so that the state player wins around 60% of the time.

The mechanics of the UW wargame and the victory point allocation reinforce the doctrinal application of a successful anti-government resistance movement and counter insurgency campaign by a state or occupying power. The key to victory for all the players mirror the three key learning objectives that the UW wargame is designed to teach based on doctrine. To be successful, all players must first develop their area complex by balancing and synchronizing the investment and employment of underground/intelligence 312, auxiliary/logistics 314, and military units 306 and balance the development of their bases 300 and surrounding influence 302.

Second, players must determine and execute a coordinated development of their organization, managing the limited resources generated locally and maximizing the benefits from external sponsors if the player chooses to develop foreign sponsors. The state benefits greatly from an international sponsor because by nature of the player titles, all three non-state players begin the wargame predisposed to oppose the state. The initial position of economic strength compared to the non-state players naturally places the state as the player to be fought.

Third, and lastly, each player must work diplomatically to partner with other players to achieve individual and or collective objectives while preventing their adversaries from gaining their goals. The non-state players do not necessarily all have to work together against the state; however, it is challenging to win the UW wargame without allies or collaborators. The state must excel at negotiation and can gain a significant advantage if they can achieve a temporary partner with one or more of the non-state players, or just prevent the three non-state players from working together throughout the UW wargame.

This UW wargame is designed to capture three fundamental doctrinal based learning objectives. First, the wargame provides a platform for developing the area command through the construction of the area complex. Players must balance the interdependence of base and military unit development with organizational expansion through influence. Second, this UW wargame teaches the importance of managing resources within a resistance or state force. Third, and lastly, the wargame shows the importance of resistance group cooperation and coordination if the resistance groups are going to be ultimately successful in defeating their oppressors.

The first training objective consists of two separate sub-objectives for developing the area complex. The first is the network development within the area command as part of the area complex, and the second sub-objective is balancing the interdependence of base 300 and military unit 306 development with organizational expansion through influence. The area complex consists of network development using both the auxiliary 314 and underground 312 elements of a resistance or non-state and logistics and intelligence elements of the state. The mechanics of the wargame make developing auxiliary 314 and underground 312 in the same geographic locations the most advantageous strategy for collecting resources and gaining influence over populations. When players expand their organization's influence, they need both auxiliary 314 and underground networks 312 to achieve the intended influence 302 and or military results and then be able to capitalize on those gains by extracting the resources 310, 316, 318 back to the organization's base. When the terrain is uncontested, there is mutually supporting network development because the primary focus is to increase the resource generation and expand the organization's influence.

Players build only an underground or just an auxiliary when they are deliberately attacking a specific location along an enemy's network. When this occurs, players are focused on the destruction of the enemy piece and not immediately exploiting the available resources in the contested region. Both single influence attacks use just the underground network, as well as unilateral guerrilla attacks supported only by the auxiliary network. The wargame mechanics are designed to drive players to use both networks in a multidimensional approach as found in doctrine, replicating the time and expense that adequately developed compartmentalized networks demand. One of the most challenging aspects of developing the area complex is to manage and resource compartmentalized networks in the same geographic regions all working toward the same organizational objectives.

Figure 7:
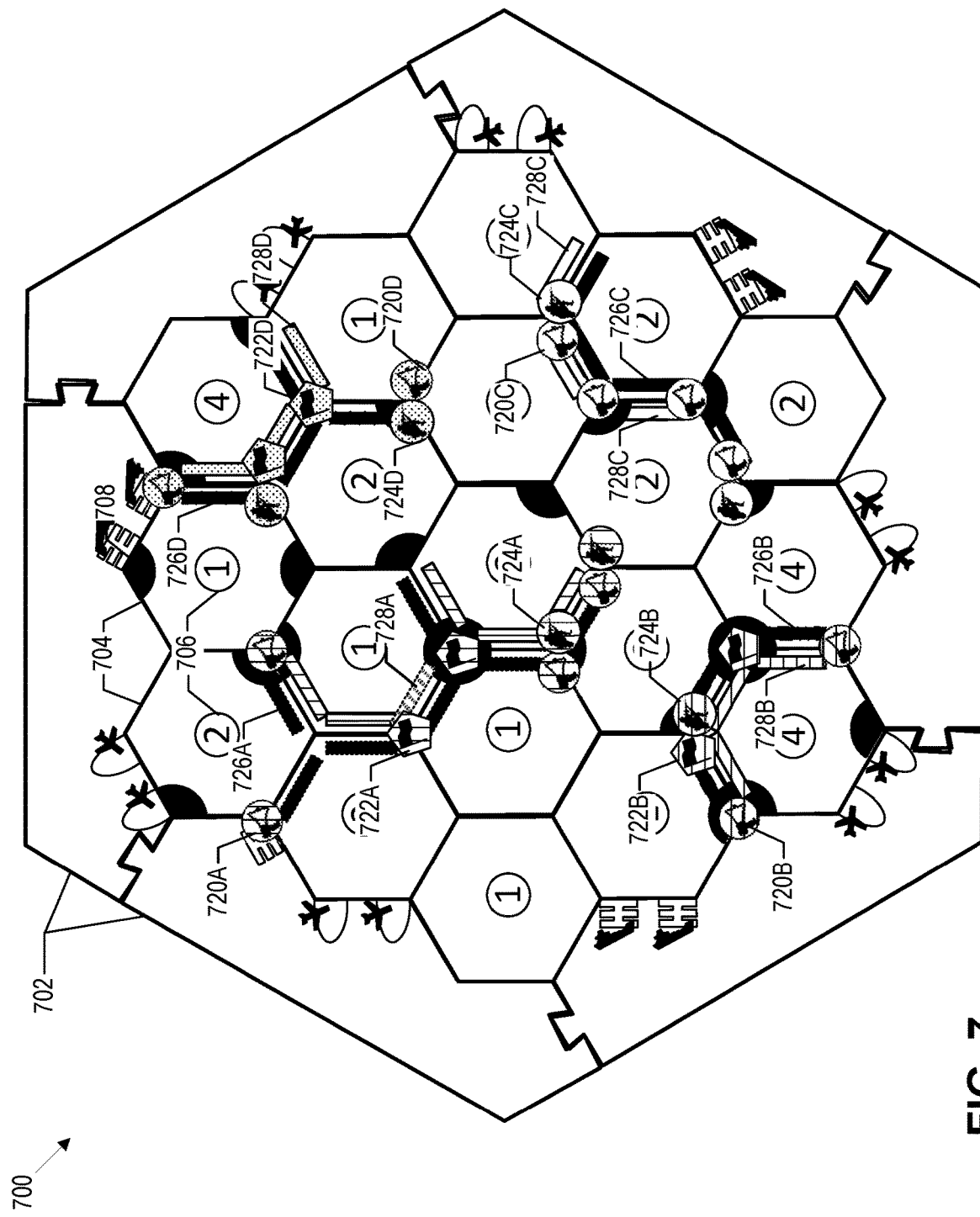
FIG. 7 illustrates a board with an example game state for an UW wargame.

In this open wargame design 700 as shown in FIG. 7, each player's area command has the advantage of seeing their entire network clearly and simultaneously. They also can observe their opponent's and allies' network development all at the same time. This common operating picture for all players enables the players to develop strategies that exploit their opponent's weaknesses, as well as learn from their opponent's mistakes as each player develops and improves their networks throughout the wargame. One example of this is seen in turn four when player B (player in Southwest with horizontally striped markers) has less space to expand because players A (player in Northwest with vertically striped markers) and C are boxing him in with their more robust networks. Players can see the strength of player A and now have the option to cooperate or continue their initial strategy. Players can make changes to their network development in response to their allies' and opponents' movements. The phases of each turn are deliberately created to capture the "fog of war" that enables resistance forces to strike where least expected. In the same turn, any player could invest in a network of any affordable length and both place the networks and then use the networks to move both influence and military forces to achieve "surprise." The wargame's educational value is that players can observe and anticipate at least some degree of enemy activity. Players are also able to see how opponents react to their movement of military units and development of bases or influence.

The second half of the first training objective is that this wargame reinforces the interdependence and balancing of base and military force development and organizational expansion through influence. The wargame assigns two victory points for each base, one victory point for each active influence, and one victory point for each functioning military unit. Players tended to focus on point generation through two methods. The first and most common technique was to expand the area complex and invest heavily in influence in as wide an area as possible. Players who had a relatively open area around their initial base development tended to expand their area complex into space and focus on the influence strategy to win the wargame. In the example wargame 700, player A is leading in victory points in the wargame with four influenced regions 710A and two bases 712A. Even though the areas player A influenced were not the most economically lucrative 706 on the board, player A did not have to compete with other players and was able to freely expand his network and collect the meager resources with no opposition.

A second strategy is to build bases in a small geographic area and avoid contact with other players. Players who were either boxed in or had a particularly active economic region of the board were more successful in developing bases and avoiding confrontation. Rarely did the base-focused strategy win, however, because regardless of the strategy, players typically cannot win the wargame with fewer than six areas (intersection of three hexagonal tiles). Players who avoid influence expansion, remain very small, and rely extensively on an external port are typically not able to be the dominant player on the board. For resistance and insurgent forces to have legitimacy within the local population, they must have credible influence. When resistance forces rely exclusively on external actors, they appear as puppets of the external sponsor lacking legitimacy. Dominant players generate a majority of their resources from areas they influence. Relying heavily on ESP limits the ability to create resources. In the example wargame 700, player B has only four regions, two of which are bases 712B, and player A has a substantial advantage due to his extensive terrain coverage. The mechanics of the wargame serve to drive players with no prior experience with these concepts to develop robust resistance networks with a balance of bases and influence. Typically players who do not invest in much of an area complex, but attempt to win the wargame using an external port and military units, are not successful. Military units are an economic drain and do not contribute to resource generation; therefore, a substantial investment in military forces with a small network is unwise due to the financial cost incurred by that organization.

Resource management in this UW wargame teaches the value of managing resources within a resistance or state organization. Through the seven-phase turn model, each player works through the strategy of allocating existing resources by investing in new infrastructure for future objectives. Then, each player employs existing and new resources to achieve desired effects on the board. Finally, when resolving conflict, each player must choose what resources they will risk, and potentially take losses on to accomplish the overall strategy. An example of cost-benefit analysis that most players grasp quickly is the cost of a military unit for the non-state player. In this example, the non-state player must invest five personnel, $10, and five weapons to purchase a new military unit. The cost of a new influence infrastructure in comparison is five people and $15. Each player must choose whether it is more lucrative to invest in influence, which is cheaper and offers the ability to move, fight, and collect additional resources, or to invest in military units, which are very useful in both offensive and defensive conflict. Players who spend heavily in military units typically have existing biases toward the use of armed force despite being trained formally in UW (which advocates a varied and indirect approach). Players' bias toward the application of force is likely from multiple direct action deployments. In most applications of the UW wargame, the winning strategies are network development and resource based. Players whose aim is to fight with other players fail to gain dominance because the number of resources expended in conflict dilute their investment in resource-generating networks. This strategy directly impacts their economic viability.

Players have to evaluate the physical and human terrain they were operating on to determine what economic strategy is best. In the example wargame 700, player B has focused exclusively on the economic productivity 706 and population centers 708 by securing those areas and building bases 712B there. Player B is surrounded by opponents and forced to fight on two fronts possibly; however, he has significantly more money than either of his two opponents. This plan may allow player B to pay players not to attack him while he continues to expand his network.

External support is not required; however, it indeed can provide critical assistance and aid in resource management if accessible. Statistics from post-wargame survey data show that 33% of the players valued external support more after the wargame than before. Often players, such as player D, do not initially position themselves well to be able to expand networks to gain external port access quickly. Players' lack of understanding of the importance of ESP during the beginning of the wargame led to this strategy. Some players are able to develop organic organizations that do not have any external support; however, even these players trade with other players around the board to receive better prices for particular resources that are in short supply. Players are forced to balance the investment of the network in the local areas, or to build a network out to an external port. The strongest teams achieve a balance of a robust organic organization with the aid of an international port. Some players choose to build their organization from the international port into the local region with varying levels of success.

Coalitions in the UW wargame teach the importance of resistance group cooperation and coordination if the resistance groups are going to be ultimately successful. A majority of the UW wargames begin with little "table talk" around the board and little if any coordination or trade. As the wargame progress and some players begin to expand more quickly than others, the "weaker" players are first complain about how they had a poor location and then, begin to work with each other to counter the stronger players. This realization around the fifth turn of the wargame is typically the most definitive factor in driving coordination, cooperation, and trading. When all three non-state players join together, share assets, and conduct coordinated attacks, the state is typically not able to withstand the concerted onslaught. In order to achieve victory, the state player should convince at least one of the non-state players not to attack. In one example wargame, one of the non-state players was able to win because they rallied the other non-state players to one team and then positioned themselves to benefit the most from the spoils as the state player was forced to give up terrain and influence. In this example, the state had 13 points when the three non-state players began a coordinated attack. The a first non-state player took the state's international port, substantially increasing the state's cost of weapons and people, while the other non-state players attacked the state from the opposite side. In two turns, the state's score went from 14 points to 9 points due to the loss of three influences and two military units.

Private discussions and open "table talking" between players is a key component to the UW wargame. Not only are the individual players able to see and learn from each other's mistakes, as stated above with network development, but they are also able to warn each other and debate strategies against opponents. For example, successful and unsuccessful bribery can take place; there may be lasting alliances and some double-crossing; etc. All these characteristics are found in the real world of UW operations and can only be demonstrated and then discussed when they are "forced out" in a competitive multiplayer open wargame like the embodiments described here. In the UW wargame, optional rules can be used to sow discontent and challenge coordination between the players. However, the optional rules are not typically implemented in physical embodiments of the wargame, which create a natural tension. Digitized versions of the wargame may have limited natural discontent because of the decrease in human interaction. Human interaction is a vital component of UW, and this essential element should remain in the UW wargame.

Optional rules can dramatically change the economy of the wargame, and also possibly the methods of network expansion and overall area complex development. In some embodiments, an optional rules appendix with several optional rules focusing on different aspects of a UW campaign can be used to modify the gameplay. For example, the wargame can be adapted to focus extensively on information operations, civic engagement such as development and governance, or strictly on information and intelligence collection and generation. Practitioners from each of these sub-specialties could work out their own optional rules tailored to their expertise based on this foundational UW wargame.

Figure 8:
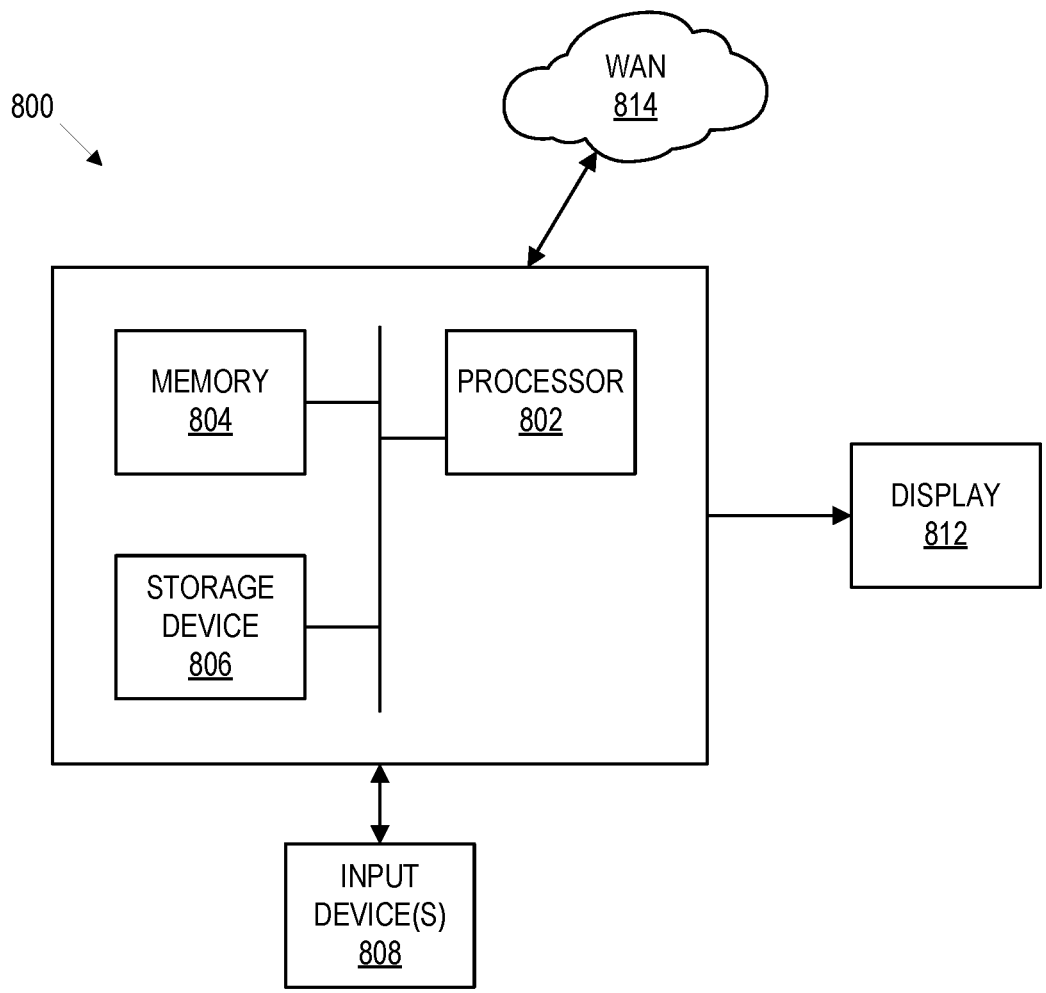
FIG. 8 illustrates an example computing system for executing a digital UW wargame.

The invention may be implemented on virtually any type of computer regardless of the platform being used. For example, as shown in FIG. 8, a computer system 800 includes a processor 802, associated memory 804, a storage device 806, and numerous other elements and functionalities typical of today's computers (not shown). The computer 800 may also include input means 808, such as a keyboard and a mouse, and output means 812, such as a monitor. The computer system 800 may be connected to a local area network (LAN) or a wide area network (e.g., the Internet) 814 via a network interface connection (not shown). Those skilled in the art will appreciate that these input and output means may take other forms.

Further, those skilled in the art will appreciate that one or more elements of the aforementioned computer system 800 may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

There are four major advantages to the digital version of the UW wargame and three drawbacks. The first advantage is that it speeds up the play of the wargame. The second advantage is that it allows more complex, flexible rules with nearly no additional computational work on the player's part. Thirdly, the digital version can be played by a more flexible number of players due to the incorporation of potential artificial intelligence (AI) or simply scaling the size of the board as discussed above. Lastly, the wargame can be distributed and updated across an enterprise continuously with maintenance rolled into an existing information technology infrastructure.

The digital wargame can be played more quickly because the calculations involved in both resource generation and also conflict resolution are calculated by the computer. This increase in the speed of play for the wargame makes it more advantageous for classroom practical exercises as well as those players who may be discouraged or intimidated by the calculations necessary each turn. This automation also allows more complicated and "realistic" methods of computing conflict and resource generation. An example would be that a single region's resources and population could be split between different players simultaneously instead of the all or nothing economic model currently used.

Digitalizing the wargame allows for the development of more complex realistic rules concerning conflict resolution, resource generation, and the introduction of additional infrastructure introducing the opportunity for more operational flexibility and creativity. The current conflict resolution matrix is rudimentary, and the conflict results are very simplistic. By digitalizing the conflict results more variation of results could be calculated through the introduction of terrain, population, morale, and equipment variables. These additional aspects of the wargame make a more realistic dynamic wargame without creating a calculation nightmare for the players each time they engage in conflict. Resource generation could be more nuanced than the current all or nothing approach as well as creating varied effects from different foreign/international partners. Currently, all players have easy access to external partners through the international market. If the wargame were digitized this aspect of the economy could be significantly enhanced to reflect the monumental challenge of gaining and maintaining international support while fighting a multi-dimensional conflict. Lastly, the "influence" infrastructure on the current wargame represents at least three distinct organizational functions and special activities (political leadership, sabotage and subversion cells, and messaging cells). To maintain playability, the current version of this wargame only uses five pieces of infrastructure total; however, a digital version could and should consider the inclusion of specific infrastructure for each of the influence sub-elements.

The introduction of a scalable board from, for example, two-eight players can be implemented digitally as well as possibly the introduction of an artificially intelligent (AI) player or players. These additions would make the wargame more usable for varying groups of players because it is much more efficient than altering a physical board.

Lastly in the digital version, it is easier for a broader player-base to gain access to the wargame, as well as operational units around the globe. Any updates, changes, or variation to the wargame can be nearly instantaneous and across the enterprise with little additional cost.

The wargame was initially designed to facilitate interpersonal interaction between players and groups of players. The need for special operations personnel to have and maintain interpersonal skills is critical. This wargame facilitates the training of interpersonal negotiations much more effectively than a digital version could. While people could potentially play the wargame around computers in the same classroom or use a chat function, the tangible board brings a dynamic that is not easily reproducible. The implementation of AI into the wargame could negate this entire learning objective from the existing wargame.

Following a small initial investment, this board wargame can remain a useful tool with no additional maintenance cost for many years. Currently, this wargame as a board based system costs roughly $50 to create with no ongoing maintenance costs. The evergrowing cost of maintenance for online systems both in hardware and in the software and security side of the cloud-based infrastructure dwarfs the cost of a board based wargame.

The board-based wargame is usable in almost any location without electricity, Internet connections, or information assurance (IA) mitigation. The board based wargame does not require bandwidth, security protocols to access, or any other IA complications which could be caused by a digital cloud-based system. The tangible board-based wargame version will also likely be more efficient with cultures and groups of people who are not as comfortable or adept as the average American male at computer-based wargames. Lastly, a solid board based wargame could be stay-behind equipment in any foreign staff school or partner unit headquarters. A cloud-based digital version could create many challenges. A portable storage medium could bridge this gap.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A board game for simulating unconventional warfare comprising:
   a plurality of hexagonal territory board pieces that each represent a territory in an unconventional warfare scenario;
   a plurality of resource production unit markers that are each placed on a corresponding territory piece of the plurality of hexagonal territory board pieces, each resource production unit marker representing a number of the resource production units that can be collected from the corresponding territory piece during each turn of the unconventional warfare scenario;
   a plurality of infrastructure markers that each represent a different infrastructure type in the unconventional warfare scenario, each different infrastructure type having an investment cost paid to initially create the corresponding infrastructure type in the unconventional warfare scenario and a maintenance cost paid during a maintenance phase of each turn during the unconventional warfare scenario, the plurality of infrastructure markers comprising:
   a plurality of base markers that are each placed at a base intersection of a corresponding territory piece, each of the base markers enabling a corresponding player of a plurality of players to collect double the resource production units that corresponds to resource production unit markers of the corresponding territory pieces and enabling the corresponding player to build a military unit that is represented by a military unit marker of a plurality of military unit markers;
   a plurality of population influence markers that are each placed at an influence intersection of a corresponding territory piece, each population influence marker enabling the corresponding player of the plurality of players to collect the resource production units that corresponds to resource production unit markers of the corresponding territory pieces and enabling the corresponding player to conduct influence attacks on neighboring infrastructure of another player of the plurality of players; and
   the plurality of military unit markers that are each placed at a military intersection of a corresponding territory piece, each military unit marker enabling the corresponding player to conduct military attacks on the neighboring infrastructure of another player of the plurality of players.

2. The board game of claim 1, further comprising:
   a plurality of logistic network markers that are each placed on a logistic edge of a corresponding territory piece, each logistic network marker enabling the corresponding player to move a corresponding military unit marker along the logistic network marker; and
   a plurality of underground network markers that are each placed on an underground edge of a corresponding territory piece, each underground network marker enabling the corresponding player to move a corresponding population influence along the underground network marker.

3. The board game of claim 2, wherein the plurality of hexagonal territory board pieces further comprises a plurality of populated territory board pieces, each populated territory board piece having at least one corner that is designated as a populated area, wherein the populated area enables the corresponding player that owns a corresponding infrastructure marker placed at the populated area to collect a personnel unit of a plurality of personnel units.

4. The board game of claim 3, further comprising:
   a weapon pool that holds a plurality of weapon units for a corresponding player of the plurality of players, the corresponding player using resource production units to purchase each weapon unit at a weapon conversion rate.

5. The board game of claim 4, wherein the corresponding player can use a portion of the plurality of personnel and weapon units to purchase one of the plurality of military unit markers.

6. The board game of claim 4, further comprising a plurality of external support port (ESP) board pieces that are placed around the plurality of hexagonal territory board pieces, each ESP board piece enabling the corresponding player that owns a corresponding infrastructure marker placed on the ESP board piece to trade resource production units for personnel units or weapon units at a corresponding trade conversion rate.

7. The board game of claim 1, wherein the plurality of players further comprises at least one state player and at least one insurgent player, wherein an insurgent player has a lower investment cost and a lower maintenance cost than a state player for each different infrastructure type.

8. The board game of claim 1, wherein each base marker is worth two victory points of a total victory points for the corresponding player, each population influence marker is worth one victory point of the total victory points for the corresponding player, and each military marker is worth one victory point of the total victory points for the corresponding player.

9. The board game of claim 8, wherein the corresponding player is victorious when the total victory points exceeds a victory threshold for a complete turn of the unconventional warfare scenario.

10. The board game of claim 8, wherein the corresponding player is victorious when:
    the total victory points of the corresponding player exceeds victory points of the other players of the plurality of players; and
    a set number of complete turns of the unconventional warfare scenario have been completed.

11. The board game of claim 1, wherein a military unit marker of the plurality of military unit markers is disrupted when the military unit marker takes two hits during a complete turn of the unconventional warfare scenario; and wherein the disrupted military unit marker is no longer able to conduct the military attacks.

12. A non-transitory computer-readable medium comprising executable instructions for causing a computer system to provide an unconventional warfare (UW) digital board game, the digital board game comprising:
    a plurality of hexagonal territory board pieces that each represent a territory in an unconventional warfare scenario;
    a plurality of resource production unit markers that are each placed on a corresponding territory piece of the plurality of hexagonal territory board pieces, each resource production unit marker representing a number of the resource production units that can be collected from the corresponding territory piece during each turn of the unconventional warfare scenario;

a plurality of infrastructure markers that each represent a different infrastructure type in the unconventional warfare scenario, each different infrastructure type having an investment cost paid to initially create the corresponding infrastructure type in the unconventional warfare scenario and a maintenance cost paid during a maintenance phase of each turn during the unconventional warfare scenario, the plurality of infrastructure markers comprising:
- a plurality of base markers that are each placed at a base intersection of a corresponding territory piece, each of the base markers enabling a corresponding player of a plurality of players to collect double the resource production units that corresponds to resource production unit markers of the corresponding territory pieces and enabling the corresponding player to build a military unit that is represented by a military unit marker of a plurality of military unit markers;
- a plurality of population influence markers that are each placed at an influence intersection of a corresponding territory piece, each population influence marker enabling the corresponding player of the plurality of players to collect the resource production units that corresponds to resource production unit markers of the corresponding territory pieces and enabling the corresponding player to conduct influence attacks on neighboring infrastructure of another player of the plurality of players; and
- the plurality of military unit markers that are each placed at a military intersection of a corresponding territory piece, each military unit marker enabling the corresponding player to conduct military attacks on the neighboring infrastructure of another player of the plurality of players.

13. The digital board game of claim 12, further comprising:
- a plurality of logistic network markers that are each placed on a logistic edge of a corresponding territory piece, each logistic network marker enabling the corresponding player to move a corresponding military unit marker along the logistic network marker; and
- a plurality of underground network markers that are each placed on an underground edge of a corresponding territory piece, each underground network marker enabling the corresponding player to move a corresponding population influence along the underground network marker.

14. The digital board game of claim 13, wherein the plurality of hexagonal territory board pieces further comprises a plurality of populated territory board pieces, each populated territory board piece having at least one corner that is designated as a populated area, wherein the populated area enables the corresponding player that owns a corresponding infrastructure marker placed at the populated area to collect a personnel unit of a plurality of personnel units.

15. The digital board game of claim 14, further comprising:
- a weapon pool that holds a plurality of weapon units for a corresponding player of the plurality of players, the corresponding player using resource production units to purchase each weapon unit at a weapon conversion rate.

16. The digital board game of claim 15, wherein the corresponding player can use a portion of the plurality of personnel and weapon units to purchase one of the plurality of military unit markers.

17. The digital board game of claim 15, further comprising a plurality of external support port (ESP) board pieces that are placed around the plurality of hexagonal territory board pieces, each ESP board piece enabling the corresponding player that owns a corresponding infrastructure marker placed on the ESP board piece to trade resource production units for personnel units or weapon units at a corresponding trade conversion rate.

18. The digital board game of claim 12, wherein the plurality of players further comprises at least one state player and at least one insurgent player, wherein an insurgent player has a lower investment cost and a lower maintenance cost than a state player for each different infrastructure type.

19. The digital board game of claim 12, wherein each base marker is worth two victory points of a total victory points for the corresponding player, each population influence marker is worth one victory point of the total victory points for the corresponding player, and each military marker is worth one victory point of the total victory points for the corresponding player; and wherein the corresponding player is victorious when the total victory points exceeds a victory threshold for a complete turn of the unconventional warfare scenario.

20. The digital board game of claim 12, wherein a military unit marker of the plurality of military unit markers is disrupted when the military unit marker takes two hits during a complete turn of the unconventional warfare scenario; and wherein the disrupted military unit marker is no longer able to conduct the military attacks.

* * * * *